Figure 1:
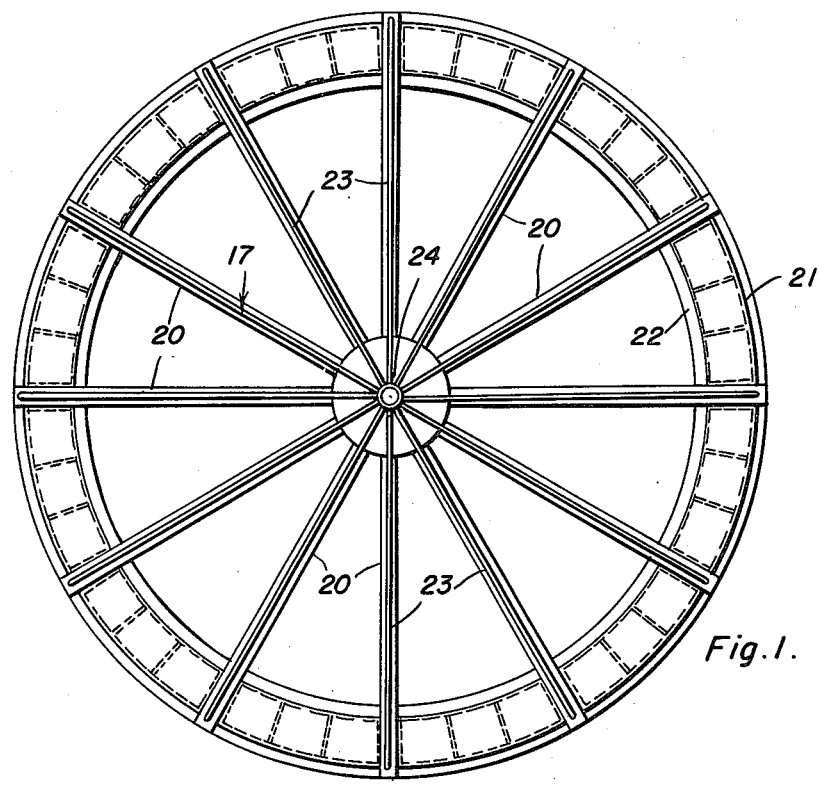

Oct. 16, 1951      A. C. BUSH      2,571,536

ANIMAL-ACTUATED INSECTICIDE DISTRIBUTOR

Filed Oct. 30, 1947      3 Sheets-Sheet 1

Inventor

Arthur C. Bush

By Clarence A. O'Brien and Harvey B. Jacobson

Attorneys

Oct. 16, 1951          A. C. BUSH          2,571,536
ANIMAL-ACTUATED INSECTICIDE DISTRIBUTOR
Filed Oct. 30, 1947          3 Sheets-Sheet 2
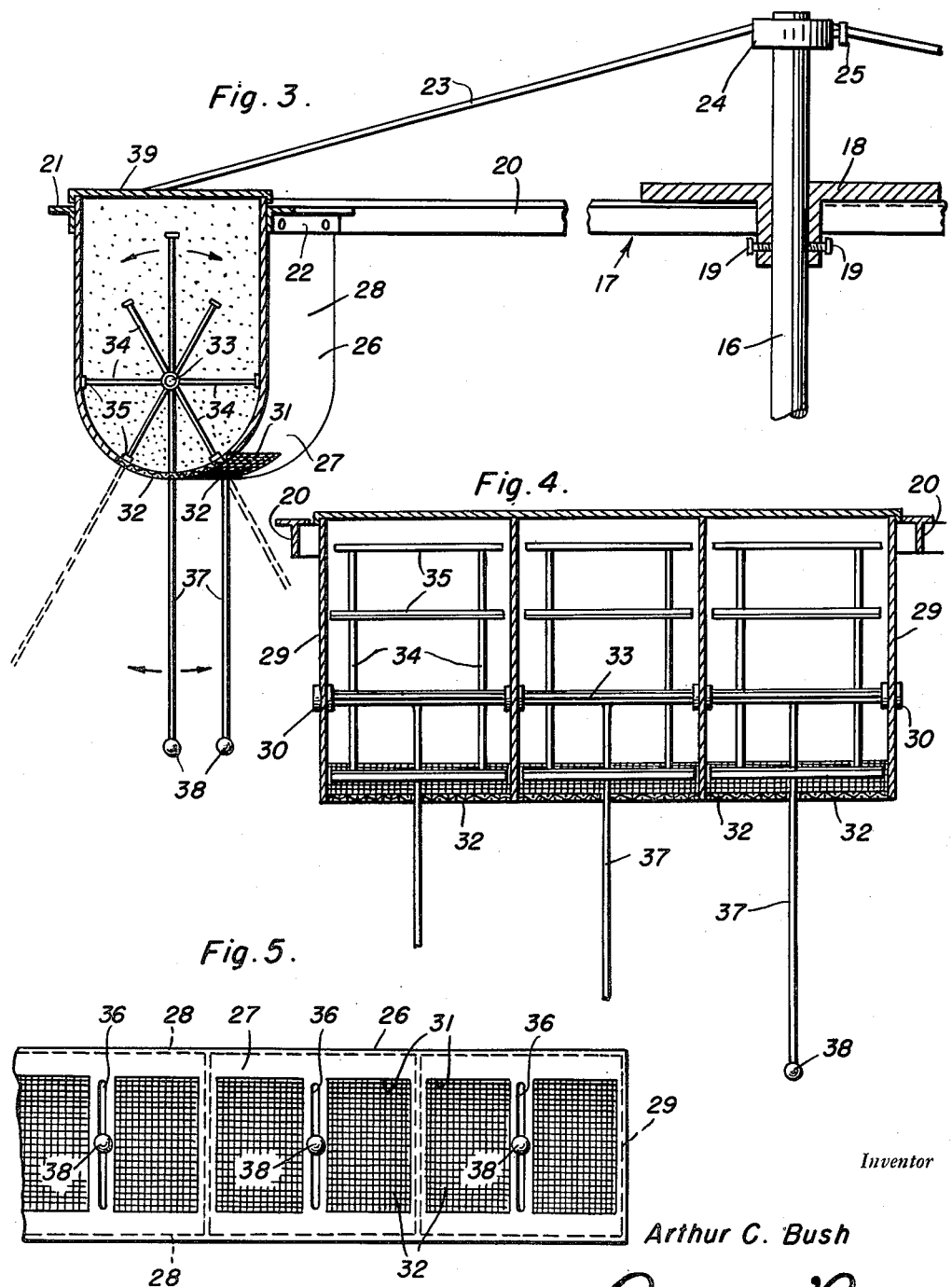
Inventor
Arthur C. Bush
By *Clarence A. O'Brien and Harvey B. Jacobson*
Attorneys

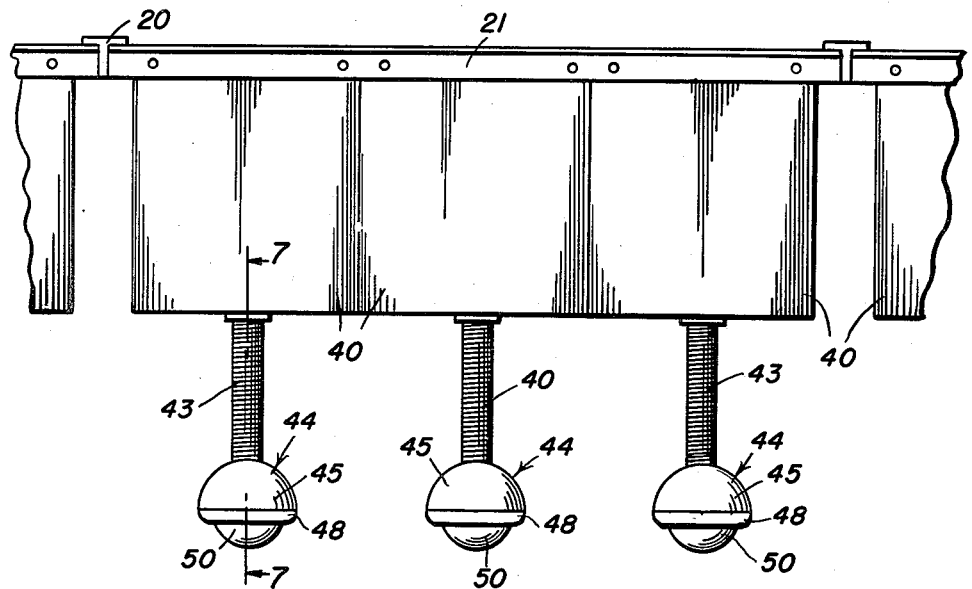
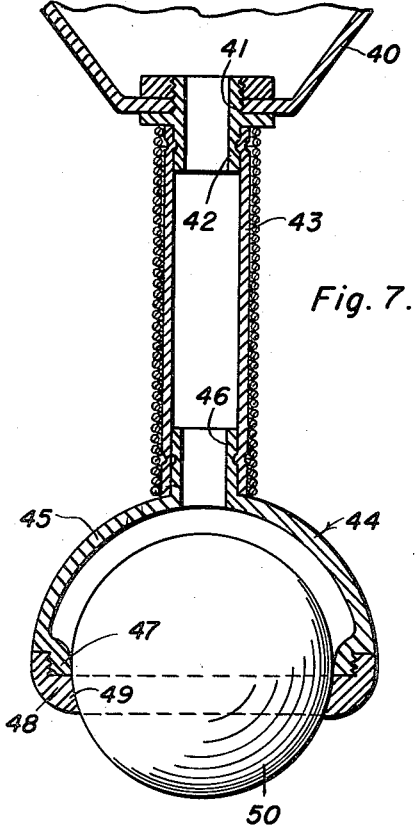
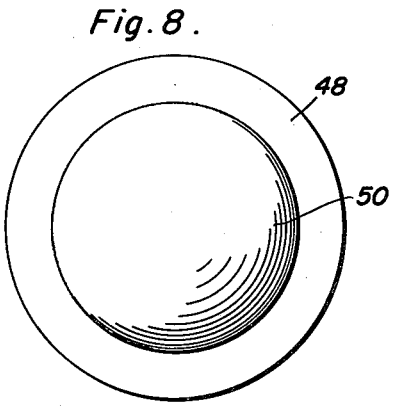

Patented Oct. 16, 1951

2,571,536

UNITED STATES PATENT OFFICE 2,571,536

ANIMAL-ACTUATED INSECTICIDE DISTRIBUTOR

Arthur C. Bush, Huntington Park, Calif., assignor of fifty per cent to Merrill D. Reed, Covelo, Calif.

Application October 30, 1947, Serial No. 783,020

4 Claims. (Cl. 119—159)

This invention relates to an animal-actuated insecticide distributor and has for its primary object to automatically dispense insecticide on an animal passing beneath the device.

Another object is to avoid the necessity of driving herds of animals to a central station for insecticide treatment.

A further object is to effect the treatment of the animals while they are in pasture or roaming a range.

The above and other objects may be attained by employing this invention which embodies among its features a standard adapted to be conveniently located within an area over which a herd of animals may be grazing, an annular row of insecticide containers supported on the standard in spaced relation to the ground, said insecticide containers lying in spaced concentric relation about the axis of the standards, means suspended from each container for contacting an animal passing therebeneath and causing the discharge of insecticide from the container onto the animal, and means supported by the standard below the level of the containers for enticing animals to pass beneath the containers.

Other features include an insecticide container having a bottom discharge outlet, a flexible hose coupled at one end to the bottom outlet, an insecticide discharge nozzle at the opposite end of the hose, an annular seat at the lower end of the discharge nozzle, and a spherical insecticide applicator entering the discharge nozzle and engaging the seat to prevent the discharge of insecticide from the nozzle until the applicator is contacted by an animal passing beneath the distributor.

Still other features include an insecticide container supported in spaced relation to the ground, said container having a foraminous bottom, an agitator mounted within the container to move across the bottom and cause the contents of the container to be discharged through the bottom, and an arm on the agitator projecting through the bottom for contacting an animal passing beneath the container and moving the agitator.

Figure 2:
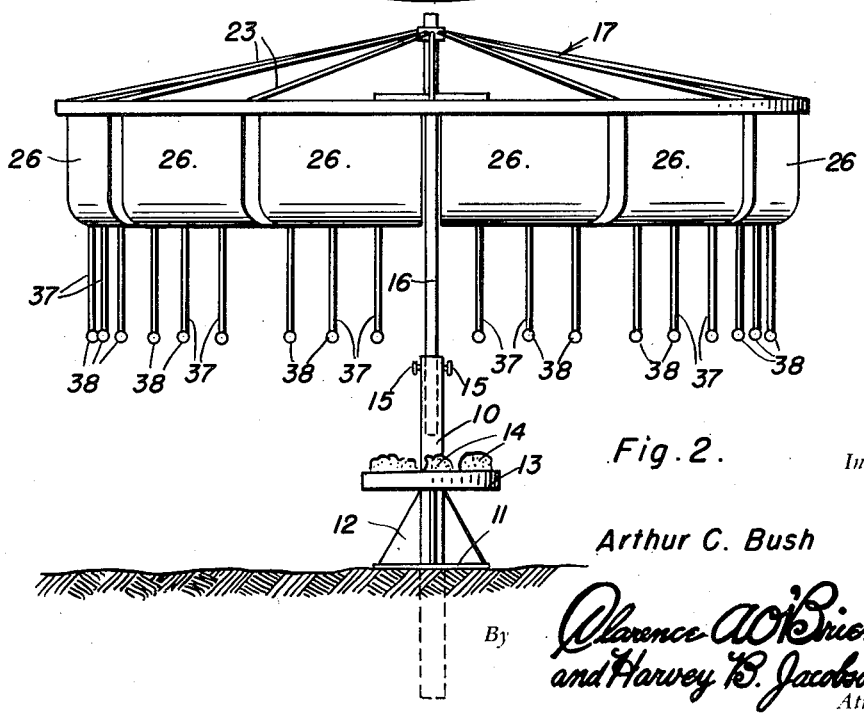

In the drawings,

Figure 1 is a top plan view of an insecticide distributor embodying the features of this invention, Figure 2 is a side view of the distributor illustrated in Figure 1, Figure 3 is a fragmentary sectional view on an enlarged scale through one of the insecticide containers, Figure 4 is a fragmentary enlarged sectional view taken on a plane perpendicular to the plane of Figure 3, Figure 5 is a bottom plan view of an insecticide container of the type illustrated in Figures 3 and 4, Figure 6 is a fragmentary side view of an insecticide distributor of a modified type, Figure 7 is a fragmentary enlarged sectional view taken substantially along the line 7—7 of Figure 6, and Figure 8 is a bottom plan view of the device illustrated in Figure 7.

Referring to the drawings in detail, a tubular standard 10 is fixed in an upright position in the ground as suggested by the dotted lines in Figure 2. In the preferred form of the invention, the standard 10 is embedded in a concrete base 11 and suitable angle brackets 12 are fixed to the base 11 and extend upwardly to engage the sides of the standard and hold it in a vertical position. Mounted on the standard 10 in spaced relation to the ground is a tray 13 upon which is supported a suitable bait 14 such as salt which will entice animals to approach the standard. Carried adjacent the upper end of the standard are opposed set screws 15, and entering the upper end of the standard and held in various vertical adjusted positions therein by the set screws 15 is a column 16 which, as illustrated, extends vertically upward and supports, at its upper end, a suitable spider designated generally 17.

The spider 17 comprises a suitable disk 18 which is held in proper position on the column 16 by suitable set screws 19, and radiating from the disk 18 are supporting arms 20. Fixed to the outer ends of the supporting arms 20 is a supporting ring 21, and fixed to the arms in concentric spaced relation to the ring 21 is a cooperating supporting ring 22. The rings 21 and 22 encircle the axis of the column 16 in concentric spaced relation, and suitable brace members 23 extend upwardly and inwardly from points adjacent the outer ends of the arms 20 to a collar 24 which is fixed adjacent the upper end of the column 16 as by set screws 25.

Supported between the rings 21 and 22 is an annular row of containers 26, each of which comprises a substantially semi-circular bottom 27, opposite ends of which merge into spaced parallel side walls 28 which are joined along opposite end edges by end walls 29. Carried by the end walls 29 in concentric relation with the curved bottom 27 are bearing bushings 30, and formed in the bottom 27 are openings 31 which are covered by a suitable foraminous material 32 such as screen wire or the like.

Mounted in the bearing bushings 30 for oscillation within the container 26 is a longitudinally extending agitator shaft 33 from which radiate arms 34, the outer ends of which are joined by agitator shoes 35. The arms are of such length that when the shaft 33 is oscillated, the shoes at the bottom of the agitator will pass closely adjacent to the curved foraminous panels 32 so as to cause the insecticide powder contained within the container 26 to be sifted through the foraminous panels 32 and deposited on the body of an animal passing beneath the container. Extending downwardly from the agitator shaft 33 and passing through slots 36 formed in the arcuate bottom 27 of the container 26 are arms 37, the lower ends of which are provided with spherical ends 38 which are adapted to be contacted by the animal.

From the foregoing, it will be evident that with an insecticide powder deposited within the containers 26, animals passing beneath the containers to reach the salt 14 will engage the spherical heads 38 of the arms 37, thus causing the agitators to swing about the axes of the shafts 33, as suggested by the broken lines in Figure 3, to cause the powdered insecticide to be discharged through the foraminous panels 32 and deposited on the animal passing therebeneath. A suitable cover 39 is removably fitted over the upper open side of each container 26 to enable the supply of powdered insecticide to be replenished as required.

In the modified form of the invention illustrated in Figures 6 through 8, inclusive, the same supporting structure as that previously described is employed, but in place of the containers 26, I employ containers 40 comprising liquid containing tanks, each of which is provided in its bottom with a discharge opening 41 into which a suitable discharge bushing 42 is fitted. Each bushing 42 constitutes a coupling to which one end of a flexible hose 43 is connected while the other end of each hose is provided with a discharge nozzle designated generally 44. The discharge nozzle 44 above referred to comprises a substantially hemispherical body 45 provided with an axial nipple 46 for coupling to the hose 43, and formed at the enlarged end of the body 45 is an externally screw-threaded, inwardly offset bead 47 upon which is threaded an annulus 48 provided on its inner surface with an annular, spherically curved seat 49. A spherical insecticide applicator 50 enters the enlarged end of the hemispherical body 45 and is held therein by the annulus 48 which serves as a retaining ring for the applicator. The curvature of the seat 49 conforms to the curvature of the spherical applicator 50, so that when the applicator is in its lowermost position, it will contact the seat 49 and prevent the escape of insecticide from the nozzle.

In use, it will be understood that the spider 17 is adjusted to the proper height so that the animals in a herd will, in approaching the salt 14 supported in the tray 13, contact the applicators 50, thus causing them to lift off of their respective seats 49 and permit the insecticide liquid contained within the containers 40 to flow around the applicators 50, to be discharged upon the backs of the animals. In this way, oil or any other suitable liquid insecticide may be applied automatically to the animals, and by placing these insecticide distributing units at strategic points over a grazing area, the animals grazing over the area will automatically become treated as they approach the standards 10 to partake of the salt in the trays 13.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. An animal-actuated insecticide distributor comprising a standard, a spider which includes a disk secured to an intermediate portion of the standard, arms radiating from said disk and carrying a pair of concentric horizontal rings, a collar secured to an upper end portion of the standard, and radiating braces secured to and between said disk and said collar, an annular row of insecticide tanks supported on and between said coaxial rings in spaced relation to the ground, said insecticide tanks lying in spaced concentric relation about the axis of the standard, means suspended from each tank for contacting an animal passing therebeneath and causing the discharge of insecticide from the tank onto the animal, means supported by the standard below the level of the tanks for supporting substances which will entice animals to pass beneath the tanks, said collar and disc being vertically adjustable on said standard to allow adjustment of the distance between the tanks and the ground whereby herds of different heights may be treated.

2. An animal-actuated insecticide distributor comprising an insecticide tank supported in spaced relation to the ground, said tank having a bottom discharge outlet, a flexible tubular element coupled at one end to the bottom outlet, an insecticide discharge nozzle at the opposite end of the hose, a seat at the lower end of the discharge nozzle and an insecticide applicator entering the discharge nozzle and having a portion depending beneath the nozzle and operatively engaging the seat to prevent the discharge of insecticide until the applicator is raised from the seat as when the applicator is contacted by an animal passing beneath the distributor.

3. An animal-actuated insecticide distributor comprising an insecticide tank supported in spaced relation to the ground, said tank having a bottom discharge outlet, a tube coupled at one end to the bottom outlet, an insecticide discharge nozzle at the opposite end of the tube, a seat in the discharge nozzle and an insecticide applicator entering the discharge nozzle and operatively engaging the seat to prevent the discharge of insecticide until the applicator is raised, said applicator being a member depending at the lower end of the nozzle so that the applicator can be raised by contact by an animal passing beneath the distributor.

4. An animal-actuated insecticide distributor comprising an insecticide tank supported in spaced relation to the ground, said tank having a bottom discharge outlet, a flexible hose coupled at one end to the bottom outlet, an insecticide discharge nozzle at the opposite end of the hose, an annular seat at the lower end of the discharge nozzle and a spherical insecticide applicator entering the discharge nozzle and engaging the seat to prevent the discharge of insecticide until the applicator is contacted by an animal passing beneath the distributor, said annular seat being threaded on said nozzle to facilitate periodic cleaning and replacement of said applicator and seat.

ARTHUR C. BUSH.

REFERENCES CITED

The following references are of record in the file of this patent:

UNITED STATES PATENTS

| Number | Name | Date |
| --- | --- | --- |
| 641,586 | French et al. | Jan. 16, 1900 |
| 882,985 | Wilson | Mar. 24, 1908 |
| 934,571 | Reckards | Sept. 21, 1909 |
| 974,042 | Dresback et al. | Oct. 25, 1910 |
| 974,252 | Fish | Nov. 1, 1910 |
| 988,669 | Schuler | Apr. 4, 1911 |
| 1,167,561 | Hudson | Jan. 11, 1916 |
| 1,184,438 | Gamble et al. | May 23, 1916 |
| 1,259,416 | Breche | Mar. 12, 1918 |
| 1,818,419 | Miller | Aug. 11, 1931 |
| 2,209,665 | Scheringer | July 30, 1940 |
| 2,273,616 | Beatty | Feb. 17, 1942 |
| 2,307,220 | Hewitt | Jan. 5, 1943 |